United States Patent
Harazono et al.

(10) Patent No.: US 9,920,809 B2
(45) Date of Patent: Mar. 20, 2018

(54) STEERING DAMPER, A SADDLE RIDING TYPE VEHICLE HAVING THE SAME, AND A METHOD OF MANUFACTURING THE SAME

(71) Applicant: Yamaha Hatsudoki Kabushiki Kaisha, Iwata-shi, Shizuoka (JP)

(72) Inventors: Yasunobu Harazono, Shizuoka (JP); Nobuo Hara, Shizuoka (JP); Satoshi Ishikawa, Shizuoka (JP); Hiromi Fukuda, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 110 days.

(21) Appl. No.: 14/398,231

(22) PCT Filed: May 8, 2013

(86) PCT No.: PCT/JP2013/002957
§ 371 (c)(1),
(2) Date: Oct. 31, 2014

(87) PCT Pub. No.: WO2013/168420
PCT Pub. Date: Nov. 14, 2013

(65) Prior Publication Data
US 2015/0090546 A1 Apr. 2, 2015

(30) Foreign Application Priority Data
May 9, 2012 (JP) .................................. 2012-107634

(51) Int. Cl.
*F16F 6/00* (2006.01)
*B62K 21/08* (2006.01)
(Continued)

(52) U.S. Cl.
CPC ................ *F16F 6/00* (2013.01); *B62K 21/08* (2013.01); *F16F 9/145* (2013.01); *F16F 9/535* (2013.01); *Y10T 29/49826* (2015.01)

(58) Field of Classification Search
CPC ...... F16F 6/00; F16F 15/18; F16F 9/53; F16F 9/535; B62K 21/08; B60G 17/0162
See application file for complete search history.

(56) References Cited

U.S. PATENT DOCUMENTS

| | | | |
|---|---|---|---|
| 6,679,508 B2 * | 1/2004 | Smith, Jr. ................ | B62D 7/22 188/267.2 |
| 2002/0140145 A1 * | 10/2002 | Smith, Jr. ............... | F16F 9/535 267/140.15 |

(Continued)

FOREIGN PATENT DOCUMENTS

| | | |
|---|---|---|
| JP | 2005-172096 A | 6/2005 |
| JP | 2006-281915 A | 10/2006 |

(Continued)

OTHER PUBLICATIONS

Official Communication issued in corresponding European Patent Application No. 13787615.7, dated Apr. 10, 2015.
(Continued)

*Primary Examiner* — Vishal R Sahni
(74) *Attorney, Agent, or Firm* — Keating and Bennett, LLP

(57) ABSTRACT

A steering damper is configured to adjust a damping force of a rotor covered by a lower casing and an upper casing by changing the viscosity of a magnetic fluid with an electromagnet. Since a magnetic fluid chamber is provided with a volume compensating unit, even when the volume of the magnetic fluid expands, or air entrainment occurs, air bubbles lighter than the magnetic fluid are collected in the volume compensating unit. Thus, characteristic variations of (Continued)

the steering damper due to volume expansion or air entrainment of the magnetic fluid are prevented.

17 Claims, 9 Drawing Sheets

(51) Int. Cl.
  *F16F 9/53* (2006.01)
  *F16F 9/14* (2006.01)

(56) References Cited

U.S. PATENT DOCUMENTS

| | | | | |
|---|---|---|---|---|
| 2006/0220340 | A1* | 10/2006 | Seki | F16F 9/145 |
| | | | | 280/272 |
| 2010/0270773 | A1* | 10/2010 | Miyashiro | B62K 11/04 |
| | | | | 280/272 |
| 2012/0022746 | A1* | 1/2012 | Negoro | B62K 21/08 |
| | | | | 701/42 |
| 2014/0249720 | A1* | 9/2014 | Sintorn | B62K 21/08 |
| | | | | 701/41 |

FOREIGN PATENT DOCUMENTS

| | | |
|---|---|---|
| JP | 2010-254117 A | 11/2010 |
| WO | 2011/118755 A1 | 9/2011 |

OTHER PUBLICATIONS

Official Communication issued in International Patent Application No. PCT/JP2013/002957, dated Aug. 13, 2013.

\* cited by examiner

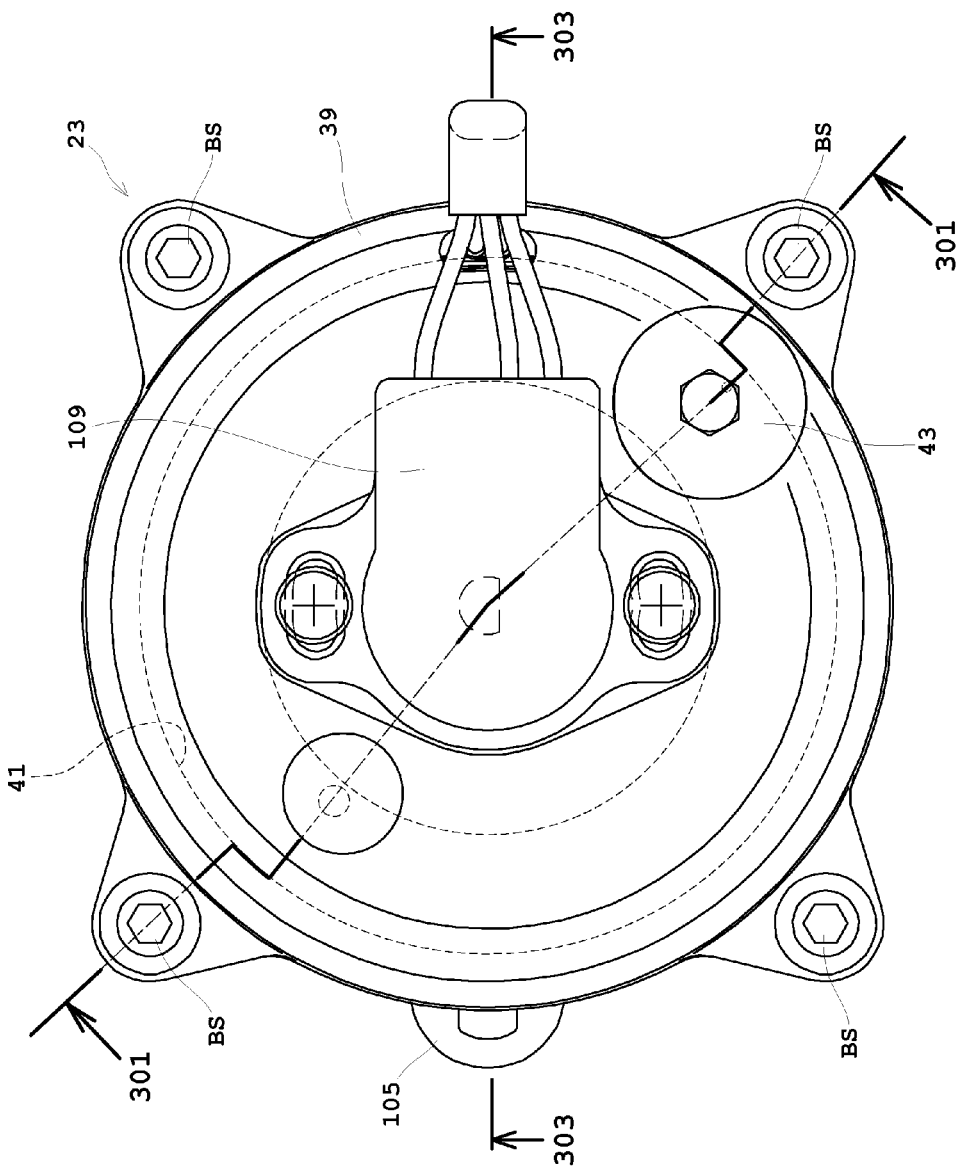

Fig.10
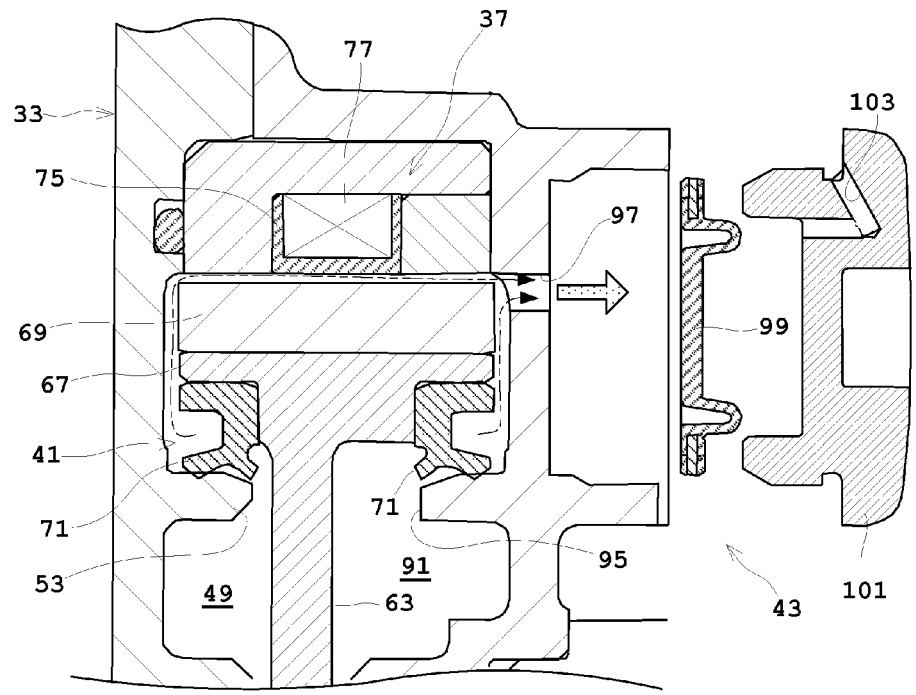
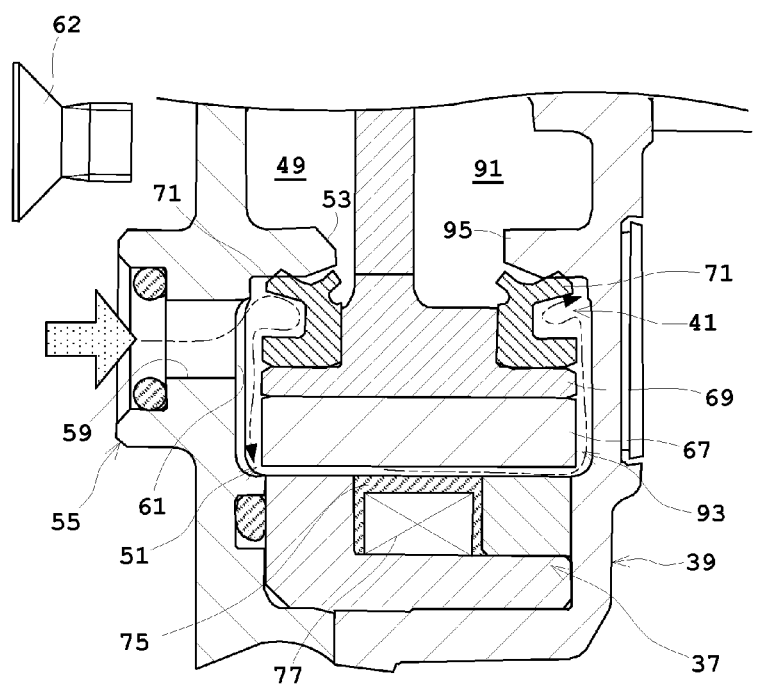

STEERING DAMPER, A SADDLE RIDING TYPE VEHICLE HAVING THE SAME, AND A METHOD OF MANUFACTURING THE SAME

BACKGROUND OF THE INVENTION

1. Field of the Invention

The present invention relates to a steering damper provided for a steering mechanism of a vehicle to adjust a damping force on steering, a saddle riding type vehicle including the same, and a method of manufacturing the same.

2. Description of the Related Art

Conventionally, this type of apparatus has a lower casing, a first seal member, an electromagnet, a second seal member and an upper casing (see Unexamined Patent Publication No. 2010-254117 (FIGS. 4-9), for example).

This steering damper includes, as its basic construction, an upper casing having a ring-like receiving recess opening downward, and a lower casing inserted in the receiving recess from below to act as its relatively rotatable lid. An electromagnet and a magnetic fluid are contained in the receiving recess, and the receiving recess is sealed by two seal members. More particularly, the electromagnet is formed of a casing main body (32b) having a sideways U-shaped groove formed circumferentially thereof to be directed outward, and a coil wound around in this groove of the casing main body (32b). The electromagnet is attached to the lower casing (32a). The electromagnet and the lower casing are assembled through a bearing metal (35) to be rotatable relative to the upper casing. In this case, a seal member is disposed between relative rotation surfaces of the two casings to seal the receiving recess. A fluid receiving chamber is formed in a gap between an inner peripheral surface of the upper casing and an outer peripheral surface of the electromagnet, and a ceiling surface of the upper casing and an upper surface of the casing main body. The magnetic fluid is injected into this fluid receiving chamber.

With the steering damper constructed in this way, the lower casing is fixed to a head tube, and the upper casing is fixed to an upper bracket holding a steering handle. When the steering handle is turned and a magnetic field is generated by the electromagnet, the viscosity of the magnetic fluid will increase. Therefore, it can provide an effect of being able to inhibit vibration and wobbling in directions of rotation of the steering handle during driving, for example.

For the above steering damper, a manufacturing method is employed in which, after being assembled as described above and before being attached to the vehicle, the magnetic fluid is supplied from an inlet and the fluid receiving chamber is filled with the magnetic fluid while vacuuming from a discharge port communicating with the fluid receiving chamber. The vacuuming is carried out, since the viscosity of the magnetic fluid is very high, in order to make it easy to fill the magnetic fluid smoothly into the fluid receiving chamber formed in a narrow space. This is done also to leave as little air as possible in the magnetic fluid chamber.

However, the conventional example with such construction has the following problems.

That is, with the conventional apparatus, when the volume of the magnetic fluid expands with temperature increase, the internal pressure of the fluid receiving chamber will increase, which causes a possibility of the upper casing and the lower casing separating slightly from each other. When such a situation arises, air entrainment will be caused by air entering the fluid receiving chamber from the seals, thereby giving rise to the problem of adversely affecting the characteristics of the steering damper.

The conventional manufacturing method has a problem of complicated manufacturing because of the need for vacuuming.

SUMMARY OF THE INVENTION

Preferred embodiments of the present invention provide a steering damper and a saddle riding type vehicle including the same which prevent characteristic changes resulting from expansion of a magnetic fluid or air entrainment.

A method according to other preferred embodiments of the present invention is a method of manufacturing a steering damper which facilitates manufacture.

A preferred embodiment of the present invention includes a lower casing with an opening located centrally thereof; a rotor including a disk portion that is circular or substantially circular in plan view, and a rotary shaft that projects upward and downward along a rotating center of the disk portion, and is configured to be rotatable with the rotary shaft inserted in the opening of the lower casing; an electromagnet fixedly disposed around the rotor and spaced from the rotor; an upper casing including a bearing, and fastened to the lower casing to cover the electromagnet and the rotor, with the rotary shaft of the rotor inserted in the bearing; a magnetic fluid chamber located at least between the rotor and the electromagnet, and filled with a magnetic fluid; and a volume compensating unit configured to communicate with the magnetic fluid chamber to compensate for volume variations of the magnetic fluid.

According to a preferred embodiment of the present invention, a damping force of the rotor covered by the lower casing and upper casing is adjusted by changing the viscosity of the magnetic fluid with the electromagnet. Since the magnetic fluid chamber is provided with the volume compensating unit, even when the volume of the magnetic fluid expands, or air entrainment occurs, air bubbles lighter than the magnetic fluid are collected in the volume compensating unit. It is therefore possible to prevent characteristic variations of the steering damper due to volume expansion or air entrainment of the magnetic fluid.

In a preferred embodiment of the present invention, it is preferable that the volume compensating unit is provided in a position of the upper casing above the magnetic fluid chamber.

Since the volume compensating unit efficiently collects air bubbles lighter than the magnetic fluid, small air bubbles are also be collected in the volume compensating unit.

In a preferred embodiment of the present invention, it is preferable that the volume compensating unit includes a communication port located in the upper casing and communicating with the magnetic fluid chamber, and an elastically deformable membrane member configured to block the communication port.

Even when the magnetic fluid expands, the expansion is absorbed since the membrane member blocking the communication port elastically deforms. Even when the magnetic fluid contracts after expansion, air entrainment will not occur since the membrane member returns to the original shape.

In a preferred embodiment of the present invention, it is preferable that the rotor is sealed by the lower casing and the upper casing fastened together.

Since dust does not easily enter the rotor having a sealed structure, the rotor operates smoothly over a long period of time. Even when the magnetic fluid expands to increase the internal pressure of the upper casing and lower casing, no deformation will occur, and hence excellent sealing performance to assure no leakage of the magnetic fluid.

In a preferred embodiment of the present invention, it is preferable that the rotor includes an outer cylinder including an outer peripheral surface of the disk portion extended in a direction of the rotary shaft; and the electromagnet is disposed in a position where a magnetic field generated passes through the outer cylinder of the rotor.

Since the magnetic field from the electromagnet passes through the outer cylinder having a larger area than the disk portion, the magnetic field which passes through the magnetic fluid chamber is increased. Therefore, the damping force occurring to the rotor is increased when the viscosity of the magnetic fluid is changed.

In a preferred embodiment of the present invention, it is preferable that the rotor includes an outer peripheral surface of the outer cylinder made of a magnetic material.

Since the magnetic field is passed through the outer cylinder efficiently, the viscosity of the magnetic fluid is adjusted efficiently.

In a preferred embodiment of the present invention, it is preferable that the rotor includes an outer peripheral member made of the magnetic material and attached to the outer peripheral surface of the outer cylinder.

Since the disk portion of the rotor is made of a nonmagnetic material and the outer peripheral member is made of a magnetic material, the degree of freedom of construction is increased while maintaining facility of a magnetic field extending to the magnetic fluid chamber.

In a preferred embodiment of the present invention, it is preferable that the rotor includes seal members provided on inner peripheries of the outer cylinder to maintain the magnetic fluid chamber liquid-tight.

Since the seal members are provided on inner peripheries of the outer cylinder, compared with a construction having the seal members in positions close to the rotary shaft, backlash centering on the rotary shaft is prevented. Therefore, air entrainment in the magnetic fluid chamber is prevented. Since the capacity of the magnetic fluid chamber is reduced, the amount of the expensive magnetic fluid used is reduced to hold down cost.

In a preferred embodiment of the present invention, it is preferable that the seal members are provided on inner peripheral surfaces of the outer cylinder.

Since the seal members are provided on the inner peripheral surfaces of the outer cylinder, the distance between the rotary shaft and seal members preferably is lengthened to a maximum extent. Therefore, backlash centering on the rotary shaft is suppressed to a minimum. As a result, air entrainment in the magnetic fluid chamber is further prevented. Since the capacity of the magnetic fluid chamber is significantly reduced or minimized, the amount of the expensive magnetic fluid used is significantly reduced or minimized to reduce or minimize costs.

In a preferred embodiment of the present invention, it is preferable that the upper casing includes an upper partition wall provided on a ceiling surface thereof between the inner peripheral surface of the outer cylinder and the rotary shaft of the rotor and projecting toward the disk portion; the lower casing includes a lower partition wall provided on a bottom surface thereof between the inner peripheral surface of the outer cylinder and the rotary shaft of the rotor and projecting toward the disk portion; and the seal members comprise oil seals provided outside the upper partition wall and the lower partition wall, with lip portions of the oil seals in contact with the outer peripheral surface of the upper partition wall and the outer peripheral surface of the lower partition wall.

An oil seal is provided outside the upper partition wall, with a lip portion of the oil seal in contact with the outer peripheral surface of the upper partition wall, and an oil seal is provided outside the lower partition wall, with a lip portion of the oil seal in contact with the outer peripheral surface of the lower partition wall. Therefore, the lip portions of the oil seals will not separate from the upper partition wall or the lower partition wall even when the upper casing and lower casing rattle to some extent. This therefore prevents leakage of the magnetic fluid.

In a preferred embodiment of the present invention, it is preferable that the magnetic fluid chamber is ring-shaped in plan view; and that there are further provided a first working bore communicating with the magnetic fluid chamber; and a second working bore communicating with the magnetic fluid chamber, and located in a position opposed to the first working bore across the rotary shaft.

By filling the magnetic fluid from one of the first working bore and the second working bore, and continuing the injection until the magnetic fluid overflows from the other of the first working bore and the second working bore, the magnetic fluid chamber is filled with the magnetic fluid while pushing air out of the magnetic fluid chamber. Therefore, air entrainment is prevented when filled up with the magnetic fluid.

Preferably, of the first working bore and the second working bore, one configured to discharge the magnetic fluid acts also as the volume compensating unit. This realizes a simplified construction.

In a preferred embodiment of the present invention, it is preferable to provide the steering damper described above; a main frame defining a framework of the vehicle; a head tube disposed at a front end of the main frame and tilted at a caster angle; a steering shaft rotatably disposed in the head tube; a steering handle disposed on an upper portion of the steering shaft; a front wheel provided on a lower portion of the steering shaft; and a rear wheel disposed rearward of the main frame; wherein the steering damper is attached to the steering handle in a position to have the volume compensating unit directed forward and in a position to have the disk portion perpendicular or substantially perpendicular to an axis of the head tube.

Since the head tube is in a position with an upper portion thereof tilted rearward to have a caster angle, the volume compensating unit will be located in an uppermost portion when the steering damper is attached to the steering handle in a position to have the volume compensating unit directed forward and in a position to have the disk portion perpendicular or substantially perpendicular to the axis of the head tube. Therefore, expansion of the magnetic fluid is absorbed by the volume compensating unit, and air bubbles produced by air entrainment are collected in the volume compensating unit. As a result, characteristic variations of the steering damper due to volume expansion of the magnetic fluid or air entrainment are prevented, and variations in handling of the saddle riding type vehicle are prevented.

In a preferred embodiment of the present invention, it is preferable that the steering damper is fixed to the steering handle, and includes a stay arm having one end thereof connected to the rotary shaft; and the stay arm has the other end fixed to the main frame.

Since the rotary shaft is fixed to the main frame through the stay arm, the steering damper is attached easily to the saddle riding type vehicle.

Further, a method of manufacturing a steering damper including a rotary shaft of a rotor rotatably held in an opening of a lower casing and a bearing of an upper casing, includes enclosing in the lower casing and the upper casing a disk portion that is circular or substantially circular in plan view and extending in outer peripheral directions from the rotary shaft, placing an electromagnet adjacent to an outer circumference of the rotor as fixed and spaced from the rotor, and filling a magnetic fluid into a magnetic fluid chamber located at least between the rotor and the electromagnet, wherein the steering damper includes a volume compensating unit configured to communicate with the magnetic fluid chamber to compensate volume variations of the magnetic fluid; a first working bore configured to communicate with the magnetic fluid chamber; and a second working bore configured to communicate with the magnetic fluid chamber, and opposed to the first working bore across the rotary shaft; and wherein the magnetic fluid is filled into the magnetic fluid chamber, in a position where one of the first working bore and the second working bore is located above the rotary shaft, by injecting the magnetic fluid from the other of the first working bore and the second working bore.

According to various preferred embodiments of the present invention, in the position where one of the first working bore and the second working bore of the steering damper is located above the rotary shaft, the magnetic fluid is injected from the other of the first working bore and the second working bore. Therefore, since the magnetic fluid injected from the one is discharged from the other, the magnetic fluid chamber is filled up with the magnetic fluid while extruding the air from the magnetic fluid chamber. The steering damper is therefore manufactured easily, with no need for vacuuming.

Of the first working bore and the second working bore, one configured to discharge the magnetic fluid may act also as the volume compensating unit.

In a preferred embodiment of the present invention, it is preferable that the magnetic fluid is injected in a position where the other of the first working bore and the second working bore is located below the one of the first working bore and the second working bore.

Since the magnetic fluid, while being injected from below, is discharged from above, any air entrainment is discharged upward. Air entrainment in the magnetic fluid chamber is therefore inhibited.

With the steering damper according to various preferred embodiments of the present invention, a damping force of the rotor covered by the lower casing and upper casing is adjusted by changing the viscosity of the magnetic fluid with the electromagnet. Since the magnetic fluid chamber is provided with the volume compensating unit, even when the volume of the magnetic fluid expands, or air entrainment occurs, air bubbles lighter than the magnetic fluid are be collected in the volume compensating unit. It is therefore possible to prevent characteristic variations of the steering damper due to volume expansion or air entrainment of the magnetic fluid.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 2A and 2B are partly enlarged views showing an attached state of a steering damper according to the preferred embodiment, in which FIG. 2A is a plan view, and FIG. 2B is a left side view.

FIG. 3 is a plan view showing an outward appearance of the steering damper.

FIG. 10 is a schematic view illustrating a method of manufacturing the steering damper.

DETAILED DESCRIPTION OF THE PREFERRED EMBODIMENTS

Preferred embodiments of the present invention will be described hereinafter with reference to the drawings. In the following description, a two-wheeled motor vehicle will be described as an example of "saddle riding type vehicle".

Figure 1:
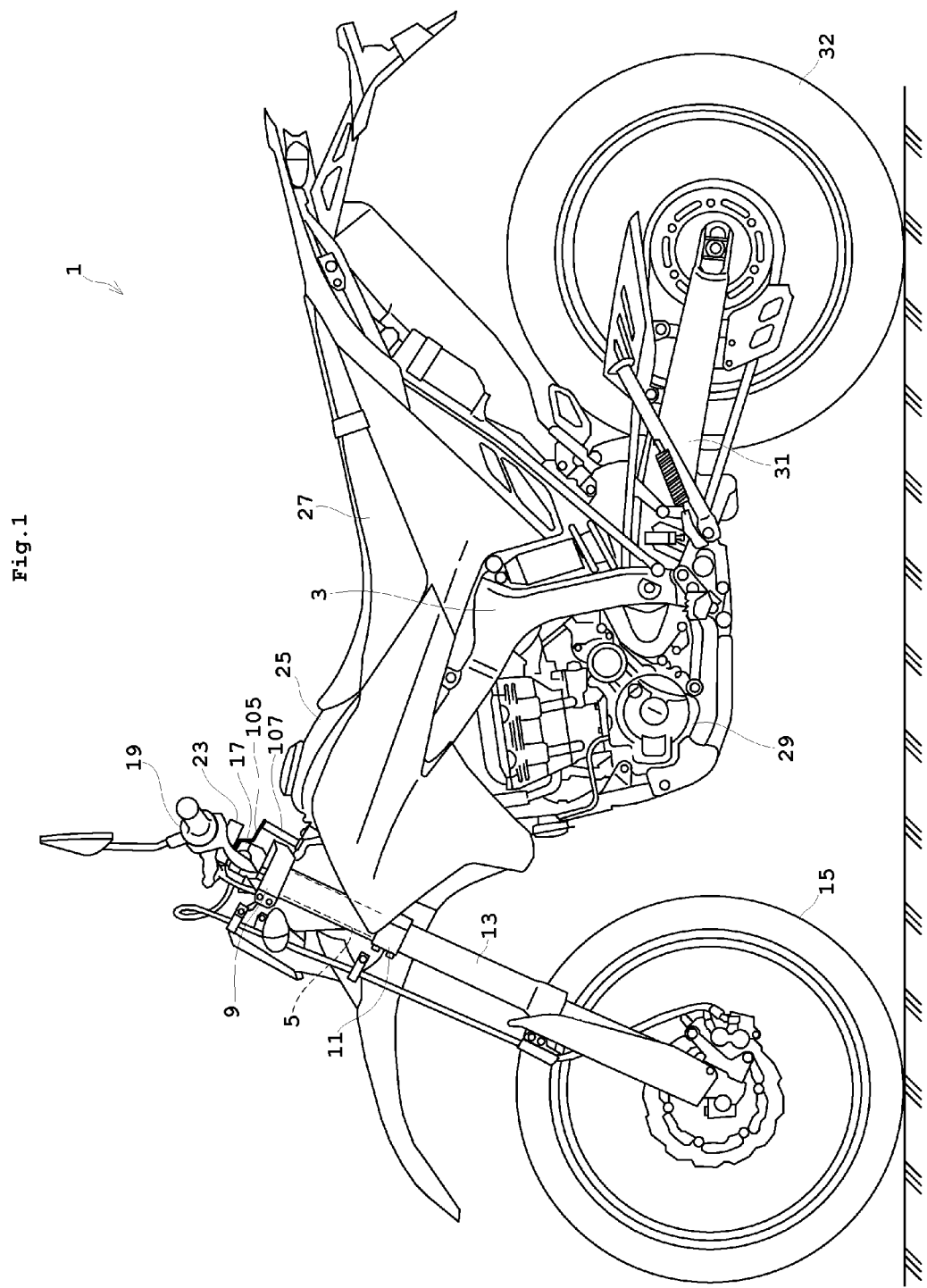
FIG. 1 is a left side view showing an entire two-wheeled motor vehicle according to a preferred embodiment of the present invention.
Figure 2A:
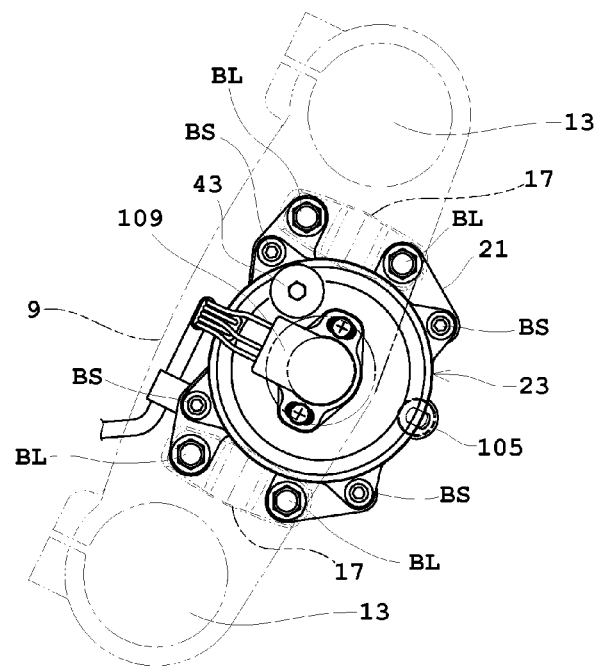
Figure 2B:
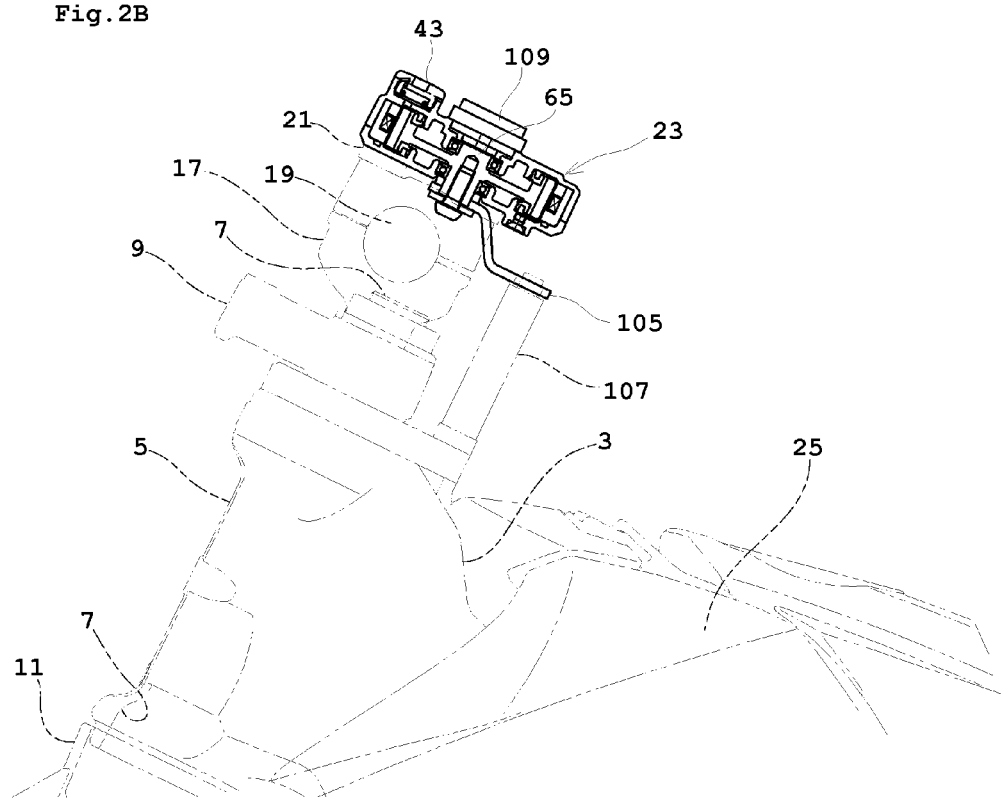

FIG. 1 is a left side view showing an entire two-wheeled motor vehicle according to the present preferred embodiment. FIGS. 2A and 2B are partly enlarged views showing an attached state of a steering damper according to the present preferred embodiment, in which FIG. 2A is a plan view, and FIG. 2B is a left side view.

A two-wheeled motor vehicle 1 includes a main frame 3. The main frame 3 defines a framework of the two-wheeled motor vehicle 1. Ahead tube 5 is disposed at a front end of the main frame 3. This head tube 5 is arranged in a tilted position appropriate to a caster angle. The head tube 5 is preferably hollow, and a steering shaft 7 is rotatably inserted in that portion. The steering shaft 7 is fixed at a top end thereof to an upper bracket 9, and is fixed at a bottom end thereof to an under bracket 11. A pair of front forks 13 are attached to opposite ends in the transverse direction of the upper bracket 9 and under bracket 11. A front wheel 15 is rotatably supported by bottom ends of the pair of front forks 13. The upper bracket 9 includes a pair of handle holders 17 arranged on an upper surface thereof. These handle holders 17 hold a steering handle 19 preferably through two bolts BL, respectively, for example. The steering handle 19 is operated by the driver. When the driver operates the steering handle 19, a steering force is transmitted through the steering shaft 7, upper bracket 9 and under bracket 11 to the pair of front forks 13 to steer the front wheel 15.

A mounting base 21 is co-fastened and fixed to an upper portion of the handlebar holders 17 preferably by the two bolts BL noted above, for example. In this case, a steering damper 23 described in detail hereinafter is attached beforehand to this mounting base 21 preferably by four bolts BS, for example. This steering damper 23 is configured to adjust a damping force when the driver operates the steering handle 19.

A fuel tank 25 is disposed on an upper portion of the main frame 3. A seat 27 is disposed on a portion of the main frame 3 rearward of the fuel tank 25. An engine 29 is disposed in a portion of the main frame 3 below the fuel tank 25. A rear arm 31 is swingably attached to the rear of the engine 29. The rear arm 31 rotatably holds a rear wheel 32 at the rear end thereof. Drive of the engine 29 is transmitted to the rear wheel 32 to propel the two-wheeled motor vehicle 1.

Figure 4:
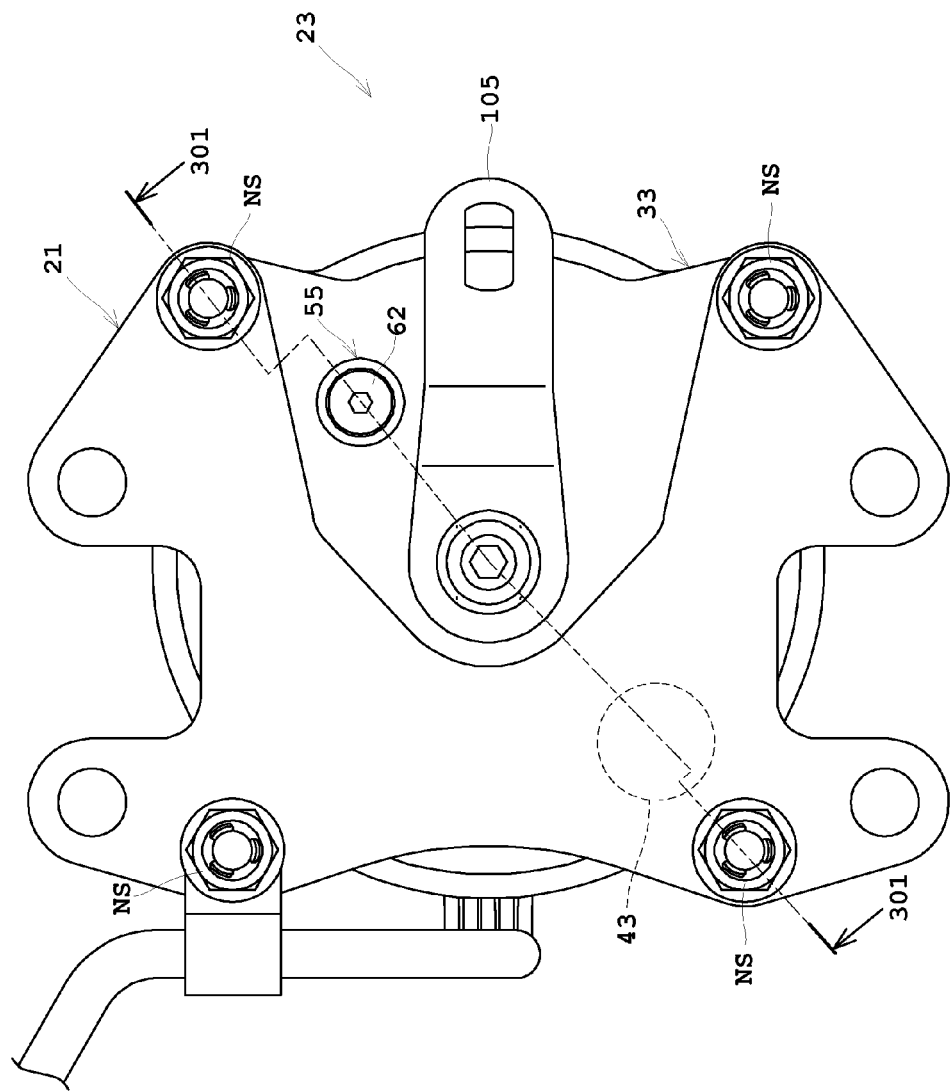
FIG. 4 is a view seen from below of an outward appearance of the steering damper.
Figure 5:
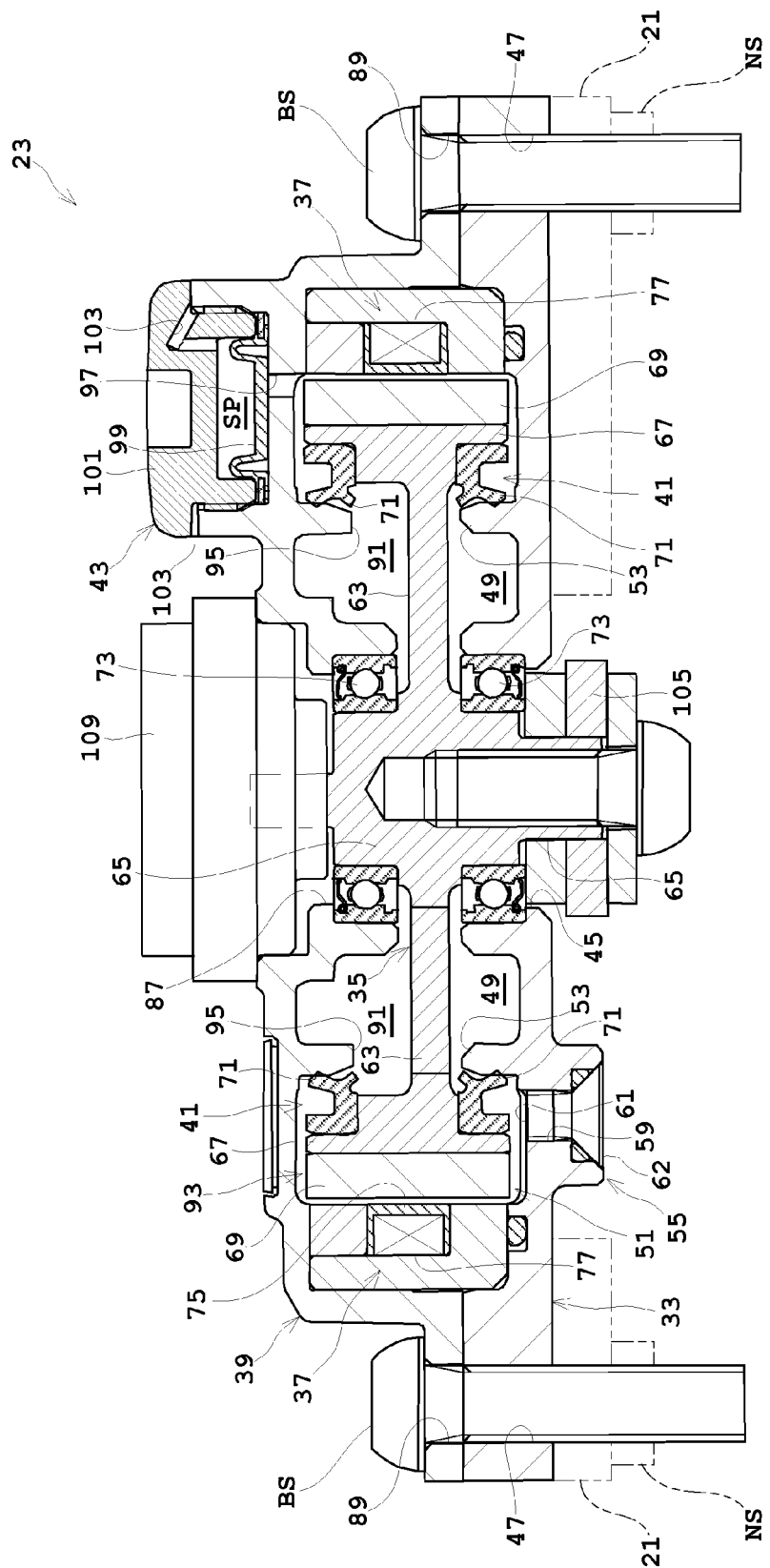
FIG. 5 is a section taken on line 301-301 of FIGS. 3 and 4.
Figure 6:
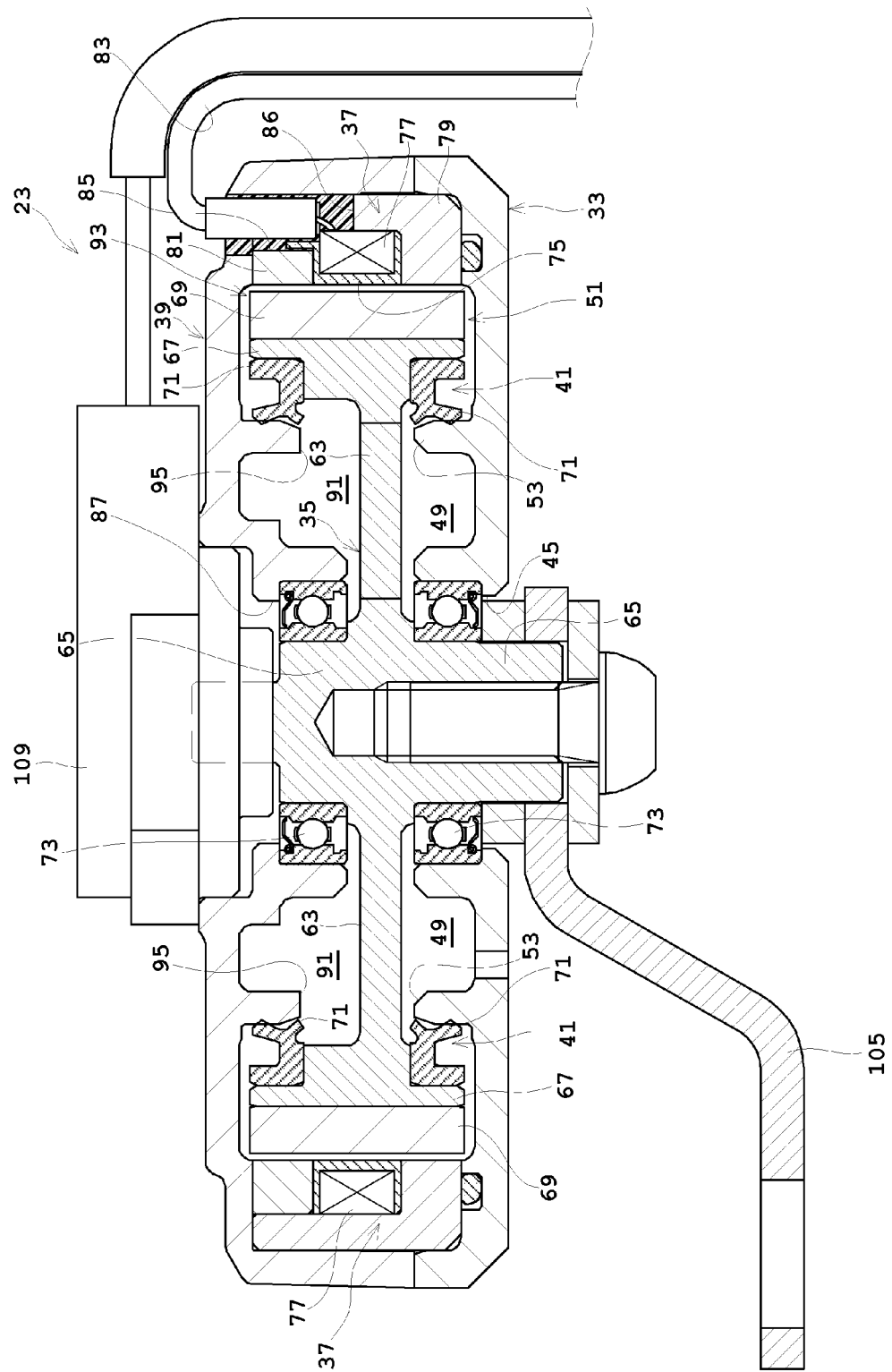
FIG. 6 is a section taken on line 303-303 of FIG. 3.
Figure 7:
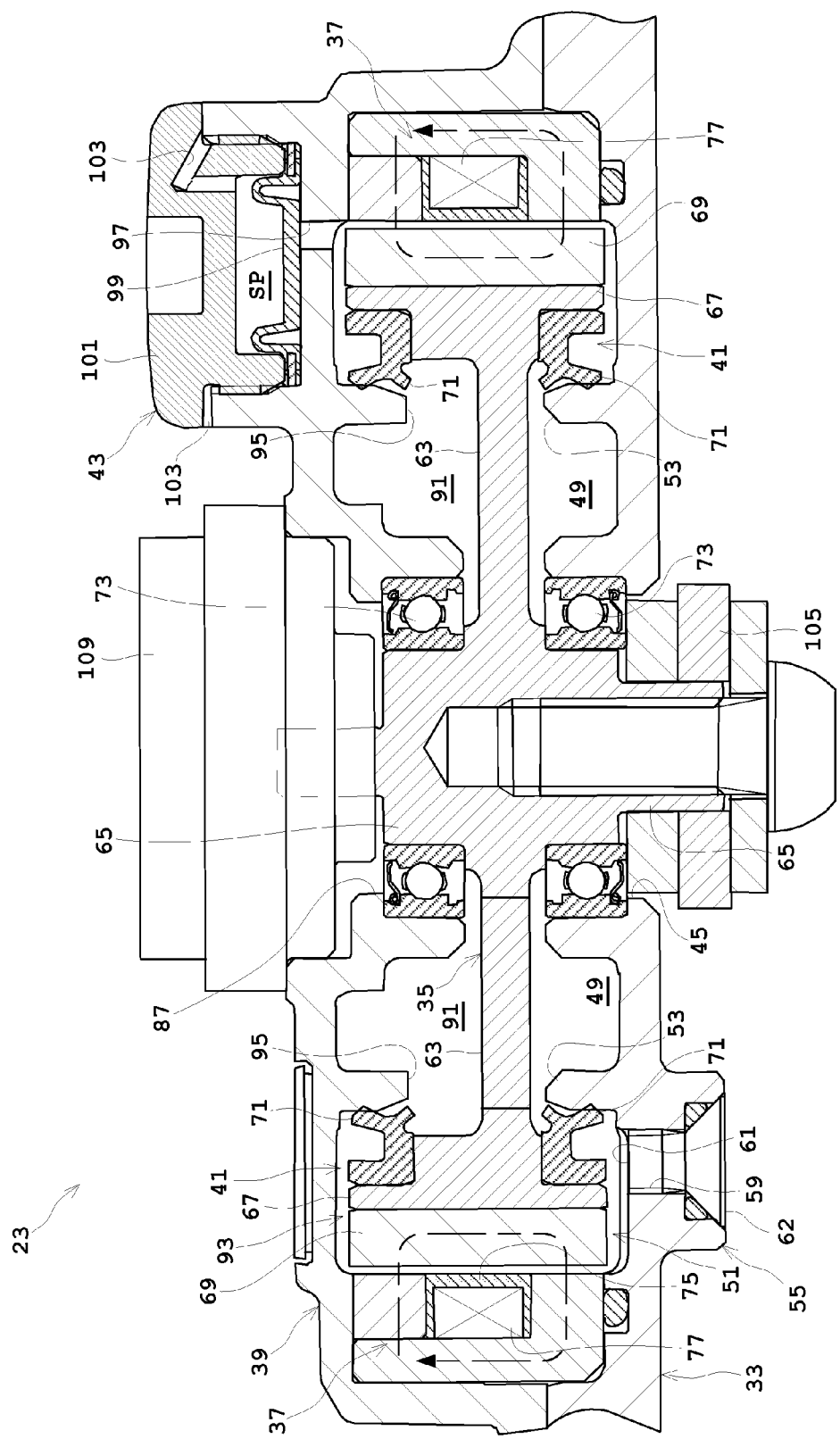
FIG. 7 is a view in vertical section showing a principal portion of FIG. 5 in enlarged form.
Figure 8:
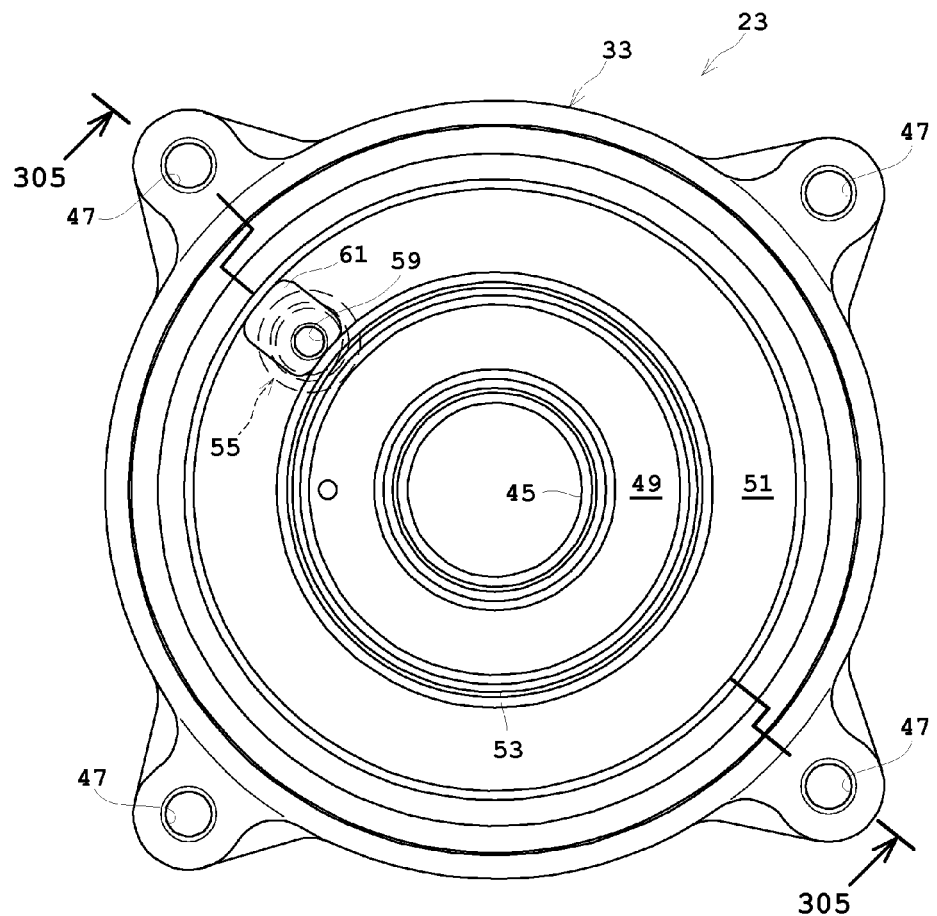
FIG. 8 is a plan view of a lower casing.
Figure 9:
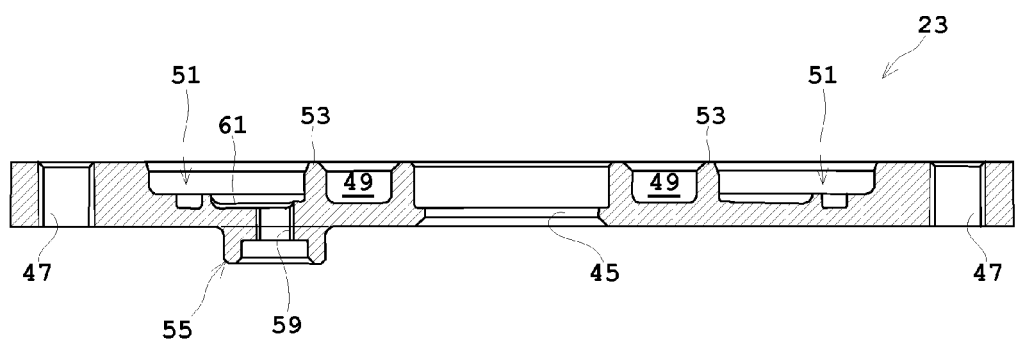
FIG. 9 is a section taken on line 305-305 of FIG. 8.

Next, the above steering damper 23 will be described in detail with reference to FIGS. 3-9. FIG. 3 is a plan view showing an outward appearance of the steering damper. FIG. 4 is a view seen from below of an outward appearance of the steering damper. FIG. 5 is a section taken on line 301-301 of FIGS. 3 and 4. FIG. 6 is a section taken on line 303-303 of FIG. 3. FIG. 7 is a view in vertical section showing a principal portion of FIG. 5 in enlargement. FIG. 8 is a plan view of a lower casing. FIG. 9 is a section taken on line 305-305 of FIG. 8.

As shown in FIG. 5, the steering damper 23 preferably includes a lower casing 33, a rotor 35, an electromagnet 37, an upper casing 39, a magnetic fluid chamber 41 and a volume compensating unit 43.

The lower casing 33 includes an opening 45 located centrally thereof in plan view. The lower casing 33 includes attaching portions 47 provided in four outer peripheral positions thereof. A space region 49 which is ring-shaped in plan view is arranged along an outer circumference of the opening 45. A receiving portion 51 which is ring-shaped in plan view is provided along an outer circumference of the space region 49. A lower partition wall 53 projecting toward the rotor 35 is provided on a bottom surface of the lower casing 33 between the space region 49 and receiving portion 51.

An injection unit 55 communicating with the receiving portion 51 is provided in one location of the lower casing 33. The injection unit 55 includes an injection bore 59 and an injection promotion chamber 61. The injection bore 59 is a through-hole which communicates the receiving portion 51 to the atmosphere. The injection promotion chamber 61 is a space lower than the other bottom area of the receiving portion 51. The injection bore 59 is closed by an O-ring and a screw 62.

The rotor 35 includes a disk portion 63, a rotary shaft 65, an outer cylinder 67 and an annular member 69. The disk portion 63 includes the rotary shaft 65 projecting upward and downward from a central portion thereof. The outer cylinder 67 includes an outer peripheral surface of the disk portion 63 extended in the directions of extension of the rotary shaft 65. The annular member 69 is press fit or cast onto an outer circumference of the outer cylinder 67. The annular member 69 is preferably made of a magnetic material such as metal, e.g. iron, nickel or manganese, or an alloy including iron such as zinc ferrite, nickel or manganese, for example. The disk portion 63 is preferably made of a nonmagnetic material such as aluminum, for example. The entire rotor 35 may be formed integrally of a magnetic material, for example. The outer cylinder 67 includes oil seals 71 press fit to upper and lower inner peripheral surfaces thereof. The oil seals 71 are attached to the inner peripheral surfaces of the outer cylinder 67 in positions to have lip portions thereof in contact with outer peripheral surfaces of an upper partition wall 95 and the lower partition wall 53. The rotary shaft 65 includes bearings 73 press fit to upper and lower outer peripheral surfaces thereof.

The electromagnet 37, as shown in FIG. 6, includes a bobbin 75, a coil 77, a yoke case 79 and a yoke cap 81. The bobbin 75 is a ring including a U-shaped section opening outward, with the coil 77 wound thereon. The yoke case 79 includes an L-shaped vertical section. The bobbin 75 is stored along with the coil 77 in the yoke case 79. After the bobbin 75 is stored in the yoke case 79, the yoke cap 81 is pressed fit to the yoke case 79 to close an upper portion of the yoke case 79. The yoke cap 81 includes an opening 85 located in one location thereof to take out wiring 83 of the coil 77. The yoke case 79 includes an opening 86 located in a position of an upper portion thereof corresponding to the opening 85. The openings 85 and 86 are filled with a sealing agent after the electromagnet 37 is assembled.

As shown in FIG. 5, the upper casing 39 includes an opening 87 located centrally thereof in plan view. The upper casing 39 includes attaching portions 89 located in positions thereof corresponding to the attaching portions 47 of the lower casing 33. A space region 91 is formed along an outer circumference of the opening 87 and in a position corresponding to the space region 49 of the lower casing 33. A receiving portion 93 is formed along an outer circumference of the space region 91 and in a position corresponding to the receiving portion 51 of the lower casing 33. The upper partition wall 95 is provided on a ceiling surface of the upper casing 39 and in a position corresponding to the lower partition wall 53. The upper partition wall 95 projects toward the rotor 35.

The upper casing 39, as shown in FIG. 7, includes the volume compensating unit 43 on an upper portion thereof. The volume compensating unit 43 includes a communication port 97, a diaphragm 99 and a cap 101. The communication port 97 is configured to provide communication between the receiving portion 93, a diaphragm accommodation space SP and the atmosphere. Its opening area is smaller than the injection bore 59 noted hereinbefore. The diaphragm 99 is preferably made of an elastically deformable material. The cap 101 is screwed in to cover the diaphragm 99 and to cover the diaphragm accommodation space SP. In this case, a circumferential flange portion of the diaphragm 99 is pinched between the cap 101 and upper casing 39. The cap 101 includes a vent 103 configured to discharge the air in the cap 101 when the diaphragm 99 deforms to project toward the cap 101, and take air into the cap 101 when the diaphragm 99 returns toward the communication port 97. The vent 103 communicates with the diaphragm accommodation space SP in the cap 101, and communicates with the atmosphere outside the cap 101 through a gap arranged along an area around a thread part of the cap 101.

The electromagnet 37 noted above is press fit on a peripheral inner wall of the receiving portion 93 of the upper casing 39. The rotor 35 is disposed inward of the electromagnet 37, with the rotary shaft 65 inserted and supported in the openings 87 and 45 of the upper casing 39 and lower casing 33 through the bearings 73. After assembling in this way, as shown in FIGS. 4 and 5, the mounting base 21 is applied to the lower surface of the lower casing 33, and the three members are co-fastened and fixed together preferably by bolts BS and nuts NS, for example. Consequently, the rotor 35 is hermetically sealed by the lower casing 33 and upper casing 39. As shown in FIG. 6, an opening of the upper casing 39 corresponding to the openings 85 and 86 is also filled with a sealing agent. This prevents entry of droplets into the steering damper 23.

The opening 87 corresponds to a "bearing" in various preferred embodiments of the present invention. The diaphragm 99 corresponds to a "membrane member" in various preferred embodiments of the present invention.

When the rotor 35 is sealed, as shown in FIG. 7, the magnetic fluid chamber 41 is provided which is defined by the oil seals 71, outer cylinder 67, annular member 69, inner peripheral surface of the electromagnet 37, bottom surface of the lower casing 33 and ceiling surface of the upper casing 39.

Filling of a magnetic fluid into the magnetic fluid chamber 41 is carried out by injecting the magnetic fluid under pressure into the injection bore 59. In this case, the injection of the magnetic fluid is maintained until the magnetic fluid begins to be discharged from the communication port 97. The discharge of the magnetic fluid from the communication port 97 indicates that the magnetic fluid chamber 41 is filled up with the magnetic fluid. So the communication port 97 is blocked by the diaphragm 99, and the diaphragm accommodation space SP is closed with the cap 101 pressing down the diaphragm 99. Further, the injection bore 59 is closed. By continuing the pressurized injection until the magnetic fluid overflows from the communication port 99 as described above, the magnetic fluid chamber 41 is filled with the magnetic fluid while pushing air out of the magnetic fluid chamber 41. Therefore, air entrainment is prevented when filling the magnetic fluid.

The injection bore 97 and communication port 99 correspond to a "first working bore" and a "second working bore" in various preferred embodiments of the present invention.

This magnetic fluid chamber 41 is filled with the magnetic fluid. The magnetic fluid may, for example, be an MR fluid (Magneto-rheological fluid), an MCF fluid (Magnetic compound fluid) or an ER fluid (Electro-rheological fluid). All of these have viscosities that are adjustable by applying a magnetic field or an electric field.

The MR fluid includes slurry with ferromagnetic fine particles dispersed in a liquid. The particle size of ferromagnetic fine particles is usually about tens of nm or less. The ferromagnetic fine particles can be formed of metal such as iron, nickel or manganese, or an alloy including iron such as manganese zinc ferrite, nickel or manganese, for example. The liquid for dispersing the ferromagnetic material may be water or an aqueous solution, or may be an organic solvent such as isoparaffin, alkyl naphthalene or perfluoropolyether.

In a state where a magnetic field is not applied, the ferromagnetic fine particles in the magnetic fluid are in a state of being dispersed almost uniformly. Generally, therefore, the magnetic fluid with no magnetic field applied thereto exhibits the behavior of a Newtonian fluid. On the other hand, when a magnetic field is applied, each magnetic domain in the magnetic fluid will polarize magnetically. Therefore, for example, in the MR fluid, associative strength occurs among the ferromagnetic fine particles. Since a plurality of ferromagnetic fine particles form clusters, apparent viscosity will increase. That is, as shown in FIG. 7, when a magnetizing field is applied by the electromagnet 37, a magnetic field will occur as indicated by two-dot chain lines, and the magnetic field is applied to the magnetic fluid, thus increasing the viscosity of the magnetic fluid. Therefore, by adjusting the current supplied to the electromagnet 37, the steering damper 23 produces a desired damping force by shear.

One end of a stay arm 105 is attached to the rotary shaft 65 projecting from the opening 45 of the lower casing 33. As shown in FIG. 2B, the other end of the stay arm 105 is fixed to the main frame 3 through a stopper 107. A steering angle sensor 109 is connected to the rotary shaft 65 projecting from the opening 87 of the upper casing 39. The steering angle sensor 109 detects a rotation angle of the rotary shaft 65 to detect a steering angle of the steering shaft 7. The steering angle sensor 109 is connected to a dedicated controller, for example, to be used as a signal to adjust the damping force of the steering damper 23. Instead of the dedicated controller, an ECU (Engine Control Unit) may be used.

The steering damper 23 having the above-described construction adjusts the damping force of the rotor 35 covered by the lower casing 33 and upper casing 39, by changing the viscosity of the magnetic fluid with the electromagnet 37.

Since the magnetic fluid chamber 41 is provided with the volume compensating unit 43, even when the volume of the magnetic fluid expands due to a temperature change of the outside environment, or air entrainment is caused by vibration, the volume expansion is absorbed by the volume compensating unit 43, or air bubbles lighter than the magnetic fluid are collected in the volume compensating unit 43. It is therefore possible to prevent damping characteristic variations of the steering damper 23 due to volume expansion or air entrainment of the magnetic fluid.

The volume compensating unit 43 is disposed in a position of the upper casing 39 above the magnetic fluid chamber 41. Therefore, since the volume compensating unit 41 efficiently collects air bubbles lighter than the magnetic fluid, small air bubbles are also be collected in the volume compensating unit 41.

The volume compensating unit 43 includes the communication port 97 provided in the upper casing 39 to provide communication between the magnetic fluid chamber 41 and diaphragm accommodation space SP, and the diaphragm 99 blocking the communication port 97 and capable of elastic deformation. Therefore, even when the magnetic fluid expands, the expansion is absorbed since the diaphragm 99 blocking the communication port 97 elastically deforms. Even when the magnetic fluid contracts after expansion, air entrainment will not occur since the diaphragm 99 returns to the original shape.

The rotor 35 is sealed by the lower casing 33 and upper casing 39 fastened together. Therefore, since dust does not enter easily, the rotor 35 operates smoothly over a long period of time. Even when the magnetic fluid expands to increase the internal pressure of the upper casing 39 and lower casing 33, no deformation will occur to the upper casing 39 and lower casing 33 fastened together, and hence excellent sealing performance to assure no leakage of the magnetic fluid.

The rotor 35 includes the annular member 69 made of a magnetic material and attached to the outer peripheral surface of the outer cylinder 67. Therefore, with the disk portion 63 and outer cylinder 63 of the rotor 35 made of a nonmagnetic material, and with the annular member 69 made of a magnetic material, the degree of freedom of construction is increased while maintaining facility of a magnetic field extending to the magnetic fluid chamber 41.

Since the oil seals 71 are provided on the inner peripheral surfaces of the outer cylinder 67, the distance between the rotary shaft 65 and oil seals 71 preferably is lengthened to a maximum extent. Therefore, backlash centering on the rotary shaft 65 is suppressed significantly or to a minimum. As a result, air entrainment in the magnetic fluid chamber 51 is further prevented. Since the capacity of the magnetic fluid chamber 41 is significantly reduced or minimized, the amount of the expensive magnetic fluid used is reduced to hold down cost.

The upper casing 39 includes the upper partition wall 95 provided on the ceiling surface thereof between the inner peripheral surface of the outer cylinder 67 and the rotary shaft 65 of the rotor 35 and projecting toward the disk portion 63. The lower casing 33 includes the lower partition wall 53 provided on the bottom surface thereof between the inner peripheral surface of the outer cylinder 68 and the rotary shaft 65 of the rotor 35 and projecting toward the disk portion 63. The oil seals 71 are provided outside the upper partition wall 95 and lower partition wall 53, with the lip portions of the oil seals 71 in contact with the outer peripheral surface of the upper partition wall 95 and the outer peripheral surface of the lower partition wall 53.

Therefore, the lip portions of the oil seals 71 will not separate from the upper partition wall 95 or the lower partition wall 53 even when the upper casing 39 and lower casing 33 rattle to some extent. This therefore prevents leakage of the magnetic fluid.

Since the communication port 97 acts also as the volume compensating unit 43, the construction of the steering damper 23 is simplified.

The steering damper 23 described above is attached to the steering handle 19 in a position to have the volume compensating unit 43 directed forward and in a position to have the disk portion 63 perpendicular or substantially perpendicular to the axis of the head tube 5. Since the head tube 5 is in a position with an upper portion thereof tilted rearward to have a caster angle, the volume compensating unit 43 will be located in an uppermost portion. Therefore, expansion of the magnetic fluid is absorbed by the volume compensating unit 43, and air bubbles produced by air entrainment are collected in the volume compensating unit 43. As a result, damping characteristic variations of the steering damper 23 due to volume expansion of the magnetic fluid or air entrainment are prevented, and variations in handling of the two-wheeled motor vehicle 1 are prevented.

The steering damper 23 is fixed to the steering handle 19, and has the stay arm 105 with one end thereof connected to the rotary shaft 65. The other end of this stay arm 105 is fixed to the main frame 3. Therefore, the steering damper 23 is attached easily to the two-wheeled motor vehicle 1.

The present invention is not limited to the forgoing preferred embodiments, but may be modified as described below.

In the foregoing preferred embodiment, the communication port 97 is preferably provided in the volume compensating unit 43, but a discharge port may be provided in a position different from the communication port 97. Then, the magnetic fluid may be injected into the magnetic fluid chamber 41 in a state of the volume compensating unit 43 being closed, and the discharge port may be closed at a point of time when the magnetic fluid overflows from the discharge port. Since the diaphragm 99 and cap 101 are already attached, it is only necessary to close the discharge by using a screw or the like not shown, and to close the injection bore 59 with the screw 62.

In the foregoing preferred embodiment of steering damper 23, the annular member 69 preferably is attached to the outer peripheral surface of the outer cylinder 67. However, the present invention is not limited to such construction. For example, the rotor 35 may have the outer cylinder 67 including the outer peripheral surface of the disk portion 63 extended in the direction of the rotary shaft 65, with the electromagnet 37 disposed in a position where the magnetic field generated passes through the outer cylinder 67 of the rotor 35. Consequently, since the magnetic flux from the electromagnet 37 passes through the outer cylinder 67 having a larger area than the disk portion 63, the magnetic flux which passes through the magnetic fluid chamber 41 is increased. Therefore, the damping force occurring to the rotor 35 is increased when the viscosity of the magnetic fluid is changed. Further, the rotor 35 may be constructed to have the outer peripheral surface of the outer cylinder 67 made of a magnetic material. Consequently, since the magnetic field is passed through the outer cylinder 67 efficiently, the viscosity of the magnetic fluid is adjusted efficiently.

In the foregoing preferred embodiment of steering damper 23, the oil seals 71 preferably are arranged on the inner peripheral surface of the outer cylinder 67. The present invention is not limited to such construction. For example, the oil seals 71 configured to maintain the magnetic fluid chamber 41 liquid-tight may be arranged on the inner circumference side of the outer cylinder 67 (e.g., at an intermediate position between the inner peripheral surface of the outer cylinder 67 and the rotary shaft 65). Consequently, compared with the construction having the oil seals 71 in positions close to the rotary shaft 65, the distance between the rotary shaft 65 and the oil seals 71 preferably is lengthened to inhibit backlash centering on the rotary shaft 65. Therefore, air entrainment in the magnetic fluid chamber 51 is prevented. Since the capacity of the magnetic fluid chamber 41 is significantly reduced, the amount of the expensive magnetic fluid used is significantly reduced to significantly reduce costs.

In the foregoing preferred embodiment of steering damper 23, the oil seals 71 preferably define seal members. Other seal members may be used which, while rotating, prevent leakage of the magnetic fluid.

In the foregoing preferred embodiment of steering damper 23, the oil seals 71 preferably are arranged on the lower partition wall 53 and upper partition wall 95, but the construction may omit the lower partition wall 53 and upper partition wall 95. This simplifies the construction of the lower casing 33 and upper casing 39, and reduces cost.

In the foregoing preferred embodiment of two-wheeled motor vehicle 1, the volume compensating unit 43 of the steering damper 23 preferably is attached in a position directed forward. It is adequate to have the volume compensating unit 43 located forward of the rotary shaft 65 as shown in FIG. 2A. The present invention is not limited to the attachment position in plan view as shown in FIG. 2A.

In the foregoing preferred embodiment of two-wheeled motor vehicle 1, the stay arm 105 of the steering damper 23 preferably is fixed to the main frame 3 by the stopper 107. However, the stopper 107 is not indispensable. For example, the stay arm 105 may be extended to have an end thereof fixed directly to the main frame 3.

The foregoing preferred embodiment of two-wheeled motor vehicle 1 illustrates the two-wheeled motor vehicle 1 as a non-limiting example of a saddle riding type vehicle. The present invention is applicable also to saddle riding type vehicles different from the two-wheeled motor vehicle 1 described hereinbefore, which include a two-wheeled motor vehicles such as a scooter and a moped other than the scooter type, a three-wheeled motor vehicle, a four-wheeled motor vehicle, an ATV (All Terrain Vehicle four-wheeled buggy), and a snowmobile, for example.

Next, non-limiting examples of methods of manufacturing the steering damper 23 will be described with reference to FIG. 10. FIG. 10 is a schematic view illustrating a method of manufacturing the steering damper.

The injection bore 59 of the steering damper 23 is opened, and further the cap 101 and diaphragm 99 are removed. In other words, the magnetic fluid chamber 41 is placed in communication with the atmosphere through the injection bore 59, and further the magnetic fluid chamber 41 is placed in communication with the atmosphere through the communication port 97. Then, the steering damper 23 is placed in a vertical position. Specifically, outer surfaces of the lower casing 33 and upper casing 39 are placed in a vertical position to locate the injection bore 59 of the steering damper 23 in a lower position than the communication port 97.

When the magnetic fluid is injected under pressure from the injection bore 59 of the steering damper 23 placed in the vertical position, the magnetic fluid will spread to and around the oil seal 71. At this time, the highly viscous magnetic fluid can easily enter the magnetic fluid chamber 41 since the injection promotion chamber 61 is formed in the opening plane of the injection bore 59 to the magnetic fluid chamber 41, and the oil seal 71 has a recess directed to the injection bore 59. And while the magnetic fluid flows also to the oil seal 71 in the upper casing 39, the magnetic fluid goes around all the circumference of the magnetic fluid chamber 41 arranged annularly in plan view. Since the communication port 97 is located in an upper position at this time, the air present in the magnetic fluid chamber 41 is gradually extruded from the communication port 97. And the injection of the magnetic fluid from the injection bore 59 is stopped as timed to the magnetic fluid beginning to overflow from the communication port 97. Then the injection bore 59 is blocked with the screw 62. Further, the diaphragm 99 is forced on the overflowing magnetic fluid, and the diaphragm 99 is attached to the bottom of the diaphragm accommodation space SP to block the communication port 97. The cap 101 is attached to pinch the outer periphery of the diaphragm 99 from above. This completes the steering damper 23 described hereinbefore.

According to the above method of manufacturing the steering damper 23, since the magnetic fluid injected from the injection bore 59 is discharged from the communication port 97, the magnetic fluid chamber 41 is filled up with the magnetic fluid while the air is extruded from the magnetic fluid chamber 41. The steering damper 23 is therefore be manufactured easily, with no need for vacuuming.

After fixing the position of the steering damper 23 so that the injection bore 59 be located below the communication port 95 from which the magnetic fluid is discharged, the magnetic fluid is injected from the injection bore 59. Thus, any air entrainment is discharged upward. Air entrainment in the magnetic fluid chamber 41 is therefore be prevented.

The present invention is not limited to the forgoing preferred embodiments, but may be modified as described below.

In the foregoing preferred embodiments, the steering damper 23 preferably is placed in a vertical position. Instead of the vertical position, a tilted position may be adopted in which the injection bore 59 is lower than the communication port 97. Such a tilted position will provide the same effects as above.

In the foregoing preferred embodiments, the communication port 97 is preferably provided in the volume compensating unit 43. A discharge port may also be provided in a position different from the communication port 97. In this case, when the magnetic fluid is injected, the communication port 97 has already been blocked by the diaphragm 99 and cap 101. It is only necessary to block the discharge port at a point of time when the magnetic fluid overflows from the discharge port. This reduces the workload required to block the magnetic fluid chamber at the point of time when the magnetic fluid overflows from the discharge port.

As described above, various preferred embodiments of the present invention are suitable for a steering damper, a saddle riding type vehicle having the same, and a method of manufacturing the same.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A steering damper comprising:
   a lower casing including an opening located centrally thereof;
   a rotor including a disk portion that is circular or substantially circular, and a rotary shaft configured to project upward and downward along a rotating center of the disk portion and to be rotatable with the rotary shaft inserted in the opening of the lower casing;
   an electromagnet fixedly disposed around the rotor and spaced from the rotor;
   an upper casing including a bearing, and fixed to the lower casing to cover the electromagnet and the rotor, with the rotary shaft of the rotor inserted in the bearing;
   a magnetic fluid chamber located at least between the rotor and the electromag-net, and filled with a magnetic fluid; and
   a volume compensating unit that communicates with the magnetic fluid chamber and that changes in volume in order to compensate for volume variations of the magnetic fluid due to expansion and contraction of the magnetic fluid.

2. The steering damper according to claim 1, wherein the volume compensating unit is located at a position of the upper casing above the magnetic fluid chamber.

3. The steering damper according to claim 1, wherein the volume compensating unit includes a communication port provided in the upper casing and configured to communicate with the magnetic fluid chamber, and an elastically deformable membrane member configured to block the communication port.

4. The steering damper according to claim 1, wherein the rotor is sealed by the lower casing and the upper casing fixed together.

5. The steering damper according to claim 1, wherein
   the rotor includes an outer cylinder including an outer peripheral surface of the disk portion extended in a direction of the rotary shaft; and
   the electromagnet is disposed in a position where a magnetic field generated passes through the outer cylinder of the rotor.

6. The steering damper according to claim 5, wherein the rotor includes an outer peripheral surface of the outer cylinder made of a magnetic material.

7. The steering damper according to claim 6, wherein the rotor includes an outer peripheral member made of the magnetic material and attached to the outer peripheral surface of the outer cylinder.

8. The steering damper according to claim 5, wherein the rotor includes seal members provided on inner peripheries of the outer cylinder to maintain the magnetic fluid chamber liquid-tight.

9. The steering damper according to claim 8, wherein the seal members are provided on inner peripheral surfaces of the outer cylinder.

10. The steering damper according to claim 9, wherein
    the upper casing includes an upper partition wall provided on a ceiling surface thereof between the inner peripheral surface of the outer cylinder and the rotary shaft of the rotor and projecting toward the disk portion;
    the lower casing includes a lower partition wall provided on a bottom surface thereof between the inner peripheral surface of the outer cylinder and the rotary shaft of the rotor and projecting toward the disk portion; and
    the seal members comprise oil seals provided outside the upper partition wall and the lower partition wall, with lip portions of the oil seals in contact with the outer peripheral surface of the upper partition wall and the outer peripheral surface of the lower partition wall.

11. The steering damper according to claim 1, wherein the magnetic fluid chamber is ring-shaped;
the steering damper further comprises:
　　a first working bore configured to communicate with the magnetic fluid chamber; and
　　a second working bore configured to communicate with the magnetic fluid chamber, and located opposite to the first working bore across the rotary shaft.

12. A saddle riding type vehicle comprising:
the steering damper according to claim 1;
a main frame;
a head tube disposed at a front end of the main frame and tilted at a caster angle;
a steering shaft rotatably disposed in the head tube;
a steering handle disposed on an upper portion of the steering shaft;
a front wheel provided on a lower portion of the steering shaft; and
a rear wheel disposed rearward of the main frame; wherein
the steering damper is attached to the steering handle at a position to have the volume compensating unit directed forward and at a position to have the disk portion be perpendicular or substantially perpendicular to an axis of the head tube.

13. The saddle riding type vehicle according to claim 12, wherein:
　　the steering damper is fixed to the steering handle, and includes a stay arm including a first end connected to the rotary shaft and a second end fixed to the main frame.

14. The steering damper according to claim 1, wherein the volume compensating unit increases in volume in response to an increase in an internal pressure of the magnetic fluid chamber.

15. A method of manufacturing a steering damper, the method comprising the steps of:
　　arranging a rotary shaft of a rotor to be rotatably held in an opening of a lower casing and a bearing of an upper casing;
　　enclosing in the lower casing and the upper casing a disk portion that is circular or substantially circular and extends in outer peripheral directions from the rotary shaft;
　　fixing the upper casing and the lower casing to each other;
　　placing an electromagnet adjacent to an outer circumference of the rotor so as to be fixed and spaced from the rotor;
　　filling a magnetic fluid into a magnetic fluid chamber formed at least between the rotor and the electromagnet;
　　providing a volume compensating unit that communicates with the magnetic fluid chamber and that changes in volume in order to compensate for volume variations of the magnetic fluid due to expansion and contraction of the magnetic fluid;
　　providing a first working bore to communicate with the magnetic fluid chamber; and
　　providing a second working bore to communicate with the magnetic fluid chamber, and opposite to the first working bore across the rotary shaft; wherein
　　the filling of the magnetic fluid into the magnetic fluid chamber is performed at a position where one of the first working bore and the second working bore is located above the rotary shaft, by injecting the magnetic fluid from the other of the first working bore and the second working bore.

16. The method of manufacturing the steering damper according to claim 15, wherein the magnetic fluid is injected at a position where the other of the first working bore and the second working bore is located below the one of the first working bore and the second working bore.

17. The method of manufacturing the steering damper according to claim 15, wherein the volume compensating unit increases in volume in response to an increase in an internal pressure of the magnetic fluid chamber.

* * * * *